Feb. 21, 1933.　　　　G. A. ALTHOFF　　　　1,897,994
LIGHT DIVIDING DEVICE
Filed June 30, 1928
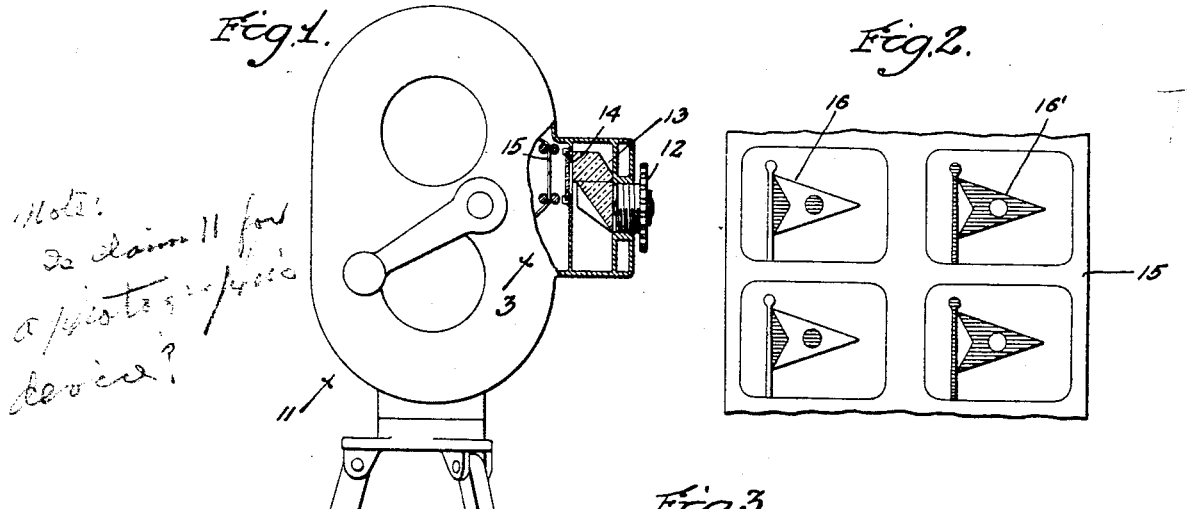
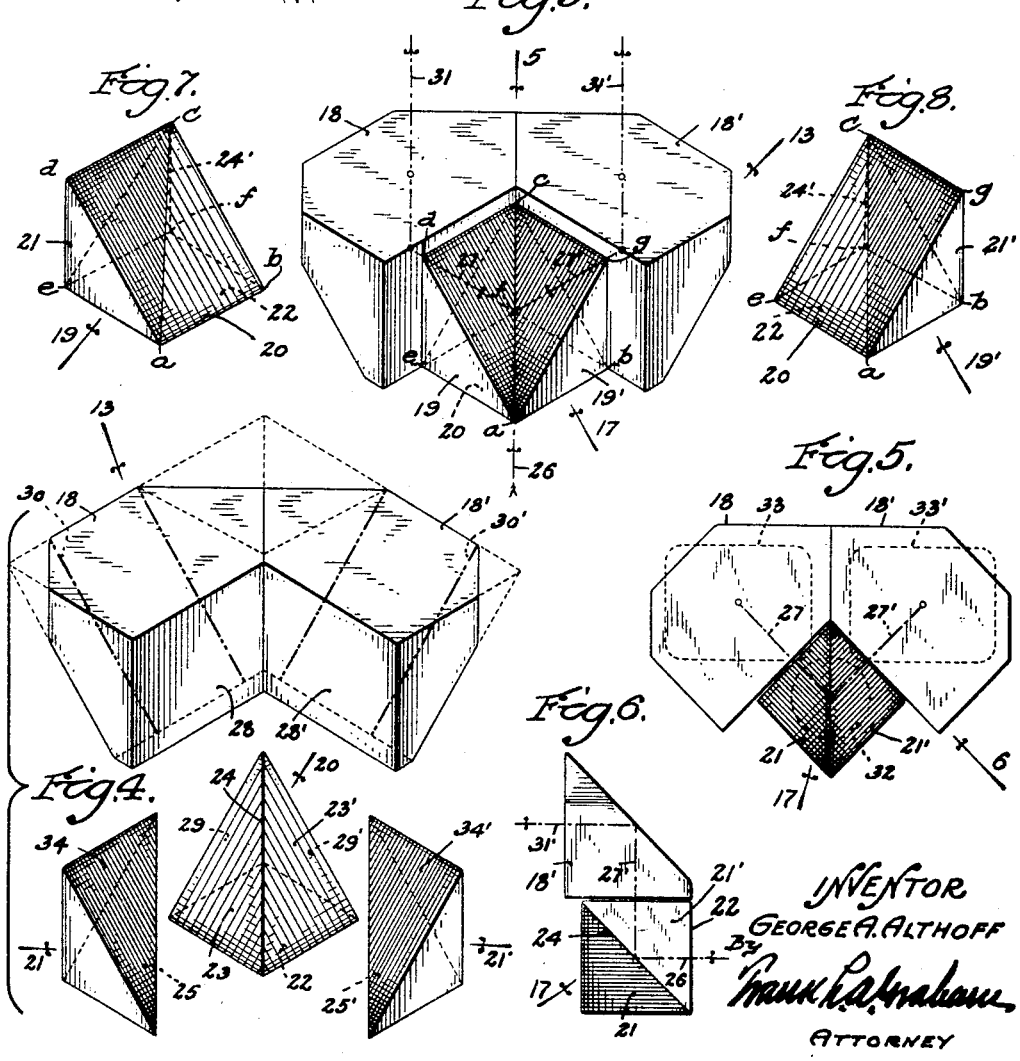
INVENTOR
GEORGE A. ALTHOFF
By Frank L. A. Graham
ATTORNEY Patented Feb. 21, 1933

1,897,994

UNITED STATES PATENT OFFICE

GEORGE A. ALTHOFF, OF GLENDALE, CALIFORNIA

LIGHT DIVIDING DEVICE

Application filed June 30, 1928. Serial No. 289,408.

This invention relates to an optical device adapted to divide an incidence beam of light carrying an image into two similar reflected beams, each carrying an image similar to that in the incidence beam, but of substantially half the intensity. The device may also be adapted to unite incidence beams which may be received direct from light collecting or focusing means such as lenses, such union being effective in the projection of a beam from the device carrying the combined images of the two received incidence beams. It will be understood that in the last case, the projected beam will have an intensity substantially equal to the sum of the intensities of the two incidence beams. It is an object of the invention to develop a device of this character in which the union or device of the light beams as mentioned, may be effected without appreciable aberration or distortion.

This invention has been developed in connection with a camera and is particularly adapted, due to its compactness and minimum chromatic and other aberrations to be used in apparatus for color photography.

It is to be understood however that this light dividing device is not necessarily confined in its application to use in photographic work, but due to its particular adaptation thereto, it will be described in connection with such an organization.

As is well known to those familiar with the art, photographs in natural colors are ordinarily produced by impressing two or more images of the same object upon photographic films, the exposure of the images upon the films being made through complementary color filters, resulting in an exposure upon each film of those parts of the image which contain color corresponding to the color of the filter through which that image is projected.

These films, carrying the mentioned images, are ordinarily dyed or projected through colored filters and then combined optically or by superposition, the projection of light therethrough being effective to blend the component colors and to give thereby a color effect corresponding to that in the original object.

Due to the fact that expensive apparatus for such work is required and that color photography of this nature also demands skilled technique, it is a particular object of this invention to develop an apparatus whereby color photographs may be produced with ordinary skill and without undue expense.

If two images which are exposed or transmitted from a single point of view through complementary color filters as was mentioned above, are brought to a focus upon a single film in parallel relation with each other and are printed upon a corresponding film, each of the images or each side of the film having the images thereon may be dyed as was previously described and if through special projecting means the two images are optically combined and projected in register upon a screen, the same natural color effect will be obtained as is obtained through the photographic or mechanical registration of the images as described above. Parallax in the projection of the images is obviated due to the fact that the negative images are exposed from a single point of view.

It is therefore an object of this invention to produce an optical light dividing device by means of which two substantially similar images of a single object may be photographically impressed in parallel relation upon a light sensitive member such as a motion picture film.

It is a further object of this invention to develop such a device which is optically symmetrical and which is compact in its form, the respective light beams passing through a similar medium thus producing minimum and similar distortions and aberrations.

It is a further object of this invention to develop a motion picture camera embodying such a device used in combination with color filters for the production of motion pictures in natural colors.

Other objects and advantageous features of this invention will be better understood from the following description of an illustrative embodiment thereof as shown in the accompanying drawing in which Fig. 1 is a partial elevation of a motion picture camera with parts broken away to illustrate one application of this light dividing device.

Fig. 2 illustrates an example of motion picture film which may be produced with the organization shown in Fig. 1.

Fig. 3 is a perspective view illustrating the light dividing device shown in Fig. 1 and may be considered as looking at the light dividing organization substantially in the direction of the arrow 3 in Fig. 1.

Fig. 4 is a detached perspective view similar to Fig. 3 but showing the sections or segments for making up this organization and indicating the manner in which these sections are formed and combined.

Fig. 5 is an elevational view which may be considered as taken substantially in the direction of the arrow 5 in Fig. 3 and showing the relative positions of a lens or light collecting and transmitting device to the fields of the reflecting images in dotted lines.

Fig. 6 is an elevational view taken substantially in the direction of arrow 6 in Fig. 5 and showing the course of light beams therethrough in the dot and dash lines.

Fig. 7 and Fig. 8 are perspective views showing the manner in which similar sectional semi-reflecting prisms are formed from the segments of the light dividing block used in this invention.

More particularly describing the invention as herein illustrated, reference numeral 11 indicates a conventional type of motion picture camera. This camera has a light focusing organization indicated by reference numeral 12, behind which a light dividing device 13 is supported in any suitable manner.

A pair of complementary color filters (if color separation is desired in one or both beams) indicated by reference numeral 14, are illustrated as being placed behind the light dividing device 13 and in front of an image receiving film or other light sensitive material, indicated by reference numeral 15.

The film 15 which is illustrated in detail in Fig. 2 is adapted to receive a pair of substantially parallel and similar images such as indicated at 16 and 16′. It will be understood that in the event these images are taken through complementary color filters, that the colored parts thereof will be exposed with different intensities as indicated by the shading of the parts of the penant shown in Fig. 2.

The light dividing device 13 is best illustrated in Figs. 3 to 6 inclusive and embodies what may be termed a central dividing or reflecting block 17 and a pair of oppositely disposed secondary reflecting members illustrated as being in the form of prisms 18 and 18′.

In order that this organization may be made more compact, the corners of the prisms 18 and 18′ are preferably cut off or ground down, their original form being indicated by the dotted line projections shown in Fig. 4.

The central light dividing or reflecting block 17 embodies what may be considered a pair of intersecting sectional prisms, each of which prisms is composed of two sections, a central or main segment common to both "sectional" prisms and a separate outside segment or slip. These mentioned sectional prisms are indicated by reference numerals 19 and 19′ and are illustrated separately in Figs. 7 and 8, the former is defined by the points $a, b, c, d, e$ and $f$, the latter being defined by the points $a, b, g, c, f$ and $e$.

The central or main segment 20 which combines with each of the slips indicated by reference numerals 21 and 21′ to form the sectional prisms 19 and 19′ has a main or light admitting face indicated by reference numeral 22 and two angularly disposed faces 23 and 23′ which intersect in the edge 24 and are opposite the face 22. The edge 24′ of the prism block 20 is substantially perpendicular to the face 22 in the form of the invention illustrated in Fig. 6, and due to the angular disposition of the faces 23 and 23′, the edge 24 meets the face 22 in an acute angle.

In describing the faces 23 and 23′ as being opposite the face 22, it will be understood that these faces are not opposite in the sense that they are parallel, but that any light admitted to the block through the face 22 must necessarily pass through or be reflected from one of the faces 23 or 23′ in its progress through the block.

It will be further understood that each of the slips 21 and 21′ is provided with a light admitting and reflecting face indicated by reference numerals 25 and 25′, these faces being similar to and adapted to be placed in engagement with the angularly disposed faces 23 and 23′ of the block 20. In order that the light entering the face 22 in what may be termed an incidence beam, indicated by the dot and dash line 26, may be divided within the organization 17 and reflected into angularly disposed beams 27 and 27′ (such beams being in the form of the invention illustrated in a plane which is substantially perpendicular to the path of the incidence beam 26 and disposed at 90° with respect to each other) it is necessary to provide between the two engaging surfaces 23 and 25 and 23′ and 25′, a semi-reflecting surface. This semi-reflecting surface, which is commonly known in the art as a half silvered mirror, is adapted to transmit and to reflect light beams, each having an intensity of one half the intensity of the incidence beam. Such surfaces may be provided either upon the faces 23 and 23′ or 25 and 25′ and it will be apparent that any light entering the organization through the face 22 must pass through or be reflected from one of these semi-reflecting surfaces before being emitted from the organization. It will also be apparent that, due to the angular arrangement of faces 23 and 23', none of the light transmitted to one of the semi-reflecting surfaces can possibly be reflected to the other semi-reflecting surface.

It will be understood that the outer surfaces 34 and 34' of the slips 21 and 21' are provided with full reflecting surfaces, the reflecting surfaces on the three prisms being indicated by the parallel line shading in the drawing.

It will now be apparent if an incidence beam such as the beam 26, enters the face 22 of the block 20, that this beam will be divided, upon reaching the semi-reflecting surface such as 23 and that two beams each having an intensity one half that of the incidence beam, will be reflected from and transmitted through this surface, the transmitted beam being reflected from surface 34. A pair of such reflected beams are indicated at 27 and 27' and it will be apparent that these two beams are angularly disposed with each other and are in a plane which is normal to the path of the incidence beam 26. In the particular form of the invention chosen for the purpose of illustration, the surfaces 23 and 23' meet the surface 22 at angles of 45° and these two surfaces (23 and 23') intersect at 24 in an angle of 90° so that the two reflected beams 27 and 27' are disposed at an angle of 90° with respect to each other and are similarly disposed at an angle of 90° with respect to the incidence beam 26.

From this reasoning it will be seen that the block 17 may be considered as embodying two sectional reflecting prisms 19 and 19', each prism, however, instead of having a total reflecting surface, may be considered as having a semi-reflecting surface, the two prisms being adapted to reflect two light beams angularly disposed with each other and in a plane which is substantially normal with the path of the incidence beam.

If secondary reflecting means such as the prism blocks 18 and 18' are placed with light admitting faces 28 and 28' substantially parallel with the light emitting faces 29 and 29' of the sectional prisms 19 and 19', the light beams 27 and 27' coming from the block 17 will enter the reflecting prisms 18 and 18' and such prisms being 45° or totaling reflecting prisms, these beams will be reflected from surfaces outlined by the dash and double dot lines in Fig. 4 and indicated by reference numerals 30 and 30'. This last mentioned reflection directs these beams into substantially parallel relation with each other, in which relation they are projected from the organization in a plane which is parallel with and offset relative to the plane of the incidence beam 26, the projecting reflected beams being indicated by reference numerals 31 and 31'.

One primary advantage of an organization of the character herein described is that none of the light which enters the main block 17 through a lens such as is indicated in dotted line 32, (Fig. 5) can be projected directly upon a film in the fields of vision indicated in dotted lines at 33 and 33'. That is, due to the offset relation of the two parallel reflected beams, any light which might be transmitted directly through the block 17 would interfere in no way with the images projected upon a film by beams 31 and 31'.

In the accompanying drawing it will be understood that the small circles shown upon the illustrations of the prisms, indicate the point of admission or emission of light beams and it will be further understood that if desired, the block 17 might be completed, that is, a front section corresponding to the section 20 might be placed between the two outer intersecting faces of the prism slips, such a block would have an edge corresponding to and tangent with the edge 24 of the main block 20.

The segments comprising the block 17 may be cemented together in any suitable manner. It will be understood however that the block 17 is not to be cemented to the reflecting prisms 18 and 18'.

It will also be understood that the angularity of the respective prisms may be altered to govern the relative positions desired in the final projected images, and as was heretofore mentioned, this invention is not to be considered as being confined to the combination of this light dividing device in connection with a photographic apparatus, but that it includes within its scope, such alterations or combinations as may fairly come within the spirit of the appended claims.

I claim as my invention:

1. An optical device for converting an incidence beam of light into two similar reflected beams angularly disposed with each other and in a plane substantially perpendicular to the path of said incidence beam, which embodies a pair of similar intersecting sectional prisms forming in part a common prism having a common surface in a plane substantially perpendicular to the path of said incidence beam and intersecting in a line which extends obliquely with respect to said common surface.

2. An optical device for converting an incidence beam of light into two substantially parallel similar reflected beams which embodies: a pair of similar intersecting sectional prisms forming in part a common prism having a common surface in a plane substantially perpendicular to the path of said incidence beam and adapted to divide said incidence beam into two reflected beams angularly disposed with each other and in a plane normal to the path of the incidence beam; and secondary reflecting means, separate from said intersecting prisms construction for directing said reflected beams into substantially parallel relation with each other.

3. An optical device for converting an incidence beam of light into two substantially parallel similar reflected beams which embodies: a pair of similar intersecting sectional prisms forming in part a common prism having a common surface and a common edge substantially perpendicular to said common surface, said common surface being in a plane transverse with the path of said incidence light beam and said prisms being adapted to divide said incidence beam into two similar reflected beams angularly disposed with each other and passing through prism faces which intersect to form said common edge; and separate secondary reflecting means opposite said intersecting faces for directing said reflected beams into substantially parallel relation with each other.

4. An optical device for converting an incidence beam of light into two substantially parallel similar reflected beams which embodies: a pair of similar intersecting sectional prisms forming in part a common prism having a common surface and a common edge substantially perpendicular to said common surface, said common surface being in a plane transverse with the path of said incidence light beam and said prisms being adapted to divide said incidence beam into two reflected beams angularly disposed with each other and passing through prism faces which intersect to form said common edge; and secondary reflecting means comprising right angle prisms each having a face substantially parallel with one of said intersecting faces of the sectional prisms for directing said reflected beams into substantially parallel relation with each other.

5. An optical device for dividing an incidence beam of light into two similar reflected beams which embodies a main prism block having a light admitting face, and a pair of similar intersecting faces which intersect in a line that extends obliquely with respect to said light admitting face; a pair of similar prism slips, each having a face corresponding to one of said intersecting faces and in engagement therewith; and a semi-reflecting surface formed between said engaging faces.

6. An optical device for dividing an incidence beam of light into two similar reflected beams which embodies a main prism block having a light admitting face, and a pair of similar intersecting faces angularly disposed with and opposite to said light admitting face; a pair of similar prism slips, each having a face corresponding to one of said intersecting faces and in engagement therewith; and a semi-reflecting surface formed between said engaging faces, said block having a single edge substantially perpendicular with the light admitting face.

7. An optical device for dividing an incidence beam of light into two similar reflected beams which embodies a main prism block having a light admitting face, and a pair of similar intersecting faces which intersect in a line that extends obliquely with respect to said light admitting face; a pair of similar prism slips, each having a face corresponding to one of said intersecting faces and in engagement therewith; a semi-reflecting surface formed between said engaging faces, said block and said slips uniting to form two light emitting faces, and secondary reflecting means opposite said faces.

8. An optical device for dividing an incidence beam of light into two similar reflected beams which embodies a main prism block having a light admitting face, and a pair of similar intersecting faces which intersect in a line that extends obliquely with respect to said light admitting face; a pair of similar prism slips, each having a face corresponding to one of said intersecting faces and in engagement therewith; a semi-reflecting surface formed between said engaging faces, said block and said slips uniting to form two light emitting faces; and secondary reflecting means comprising right angle prisms each having a face parallel with one of the light emitting faces of said light dividing prism construction.

9. For use in combination with a camera; means for producing two similar images of a single object from a single point of view embodying: focusing means; light dividing means for converting an incidence beam coming from said focusing means into two angularly disposed reflected beams in a plane substantially perpendicularly to the path of said incidence beam, said light dividing means including a pair of intersecting reflecting surfaces, said surfaces having a semi-reflecting portion and a total reflecting portion; secondary reflecting means for diverting said reflected beams into a plane substantially parallel with the axis of said focusing means; and a light sensitive member adapted to be light impressed by said reflected beams.

10. For use in combination with a camera, means for producing two similar images of a single object from a single point of view embodying: focusing means; light dividing means for converting an incidence beam coming from said focusing means into two angularly disposed reflected beams in a plane substantially perpendicular to the path of said incidence beam, said light dividing means including a pair of intersecting reflecting surfaces, said surfaces having a semi-reflecting portion and a total reflecting portion; a secondary reflecting means for diverting said reflected beams into a plane substantially parallel with the axis of said focusing means; and a light sensitive member adapted to be light impressed by said reflected beams, said light sensitive member being offset relative to the axis of said focusing means.

11. For use in combination with a camera means for producing two similar images of a single object from a single point of view embodying: focusing means; light dividing means for converting an incidence beam coming from said focusing means into two angularly disposed reflected beams in a plane substantially perpendicular to the path of said incidence beam, said light dividing means including a pair of intersecting reflected surfaces, said surfaces having a semi-reflecting portion and a total reflecting portion; secondary reflecting means for diverting said reflected beams into a plane substantially parallel with the axis of said focusing means; a light sensitive member adapted to be light impressed by said reflected beams and complementary color filters interposed in the paths of said reflected beams.

In testimony whereof, I have hereunto set my hand at Los Angeles, California, this 21 day of June, 1928.

GEORGE A. ALTHOFF.